US012052676B2

United States Patent
Toeda et al.

(10) Patent No.: US 12,052,676 B2
(45) Date of Patent: Jul. 30, 2024

(54) RADIO BASE STATION

(71) Applicant: NTT DOCOMO, INC., Tokyo (JP)

(72) Inventors: Teruaki Toeda, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 346 days.

(21) Appl. No.: 17/605,465

(22) PCT Filed: Apr. 26, 2019

(86) PCT No.: PCT/JP2019/018072
§ 371 (c)(1),
(2) Date: Oct. 21, 2021

(87) PCT Pub. No.: WO2020/217492
PCT Pub. Date: Oct. 29, 2020

(65) Prior Publication Data
US 2022/0217664 A1  Jul. 7, 2022

(51) Int. Cl.
*H04W 56/00* (2009.01)
*H04W 84/04* (2009.01)
*H04W 88/08* (2009.01)

(52) U.S. Cl.
CPC ...... *H04W 56/0015* (2013.01); *H04W 84/045* (2013.01); *H04W 88/08* (2013.01)

(58) Field of Classification Search
CPC ........... H04W 56/0015; H04W 56/002; H04W 88/08; H04W 84/045
See application file for complete search history.

(56) References Cited

U.S. PATENT DOCUMENTS

| 11,310,757 | B2* | 4/2022 | Yu | H04W 56/006 |
| 2021/0385791 | A1* | 12/2021 | Vikberg | H04W 68/00 |
| 2022/0140881 | A1* | 5/2022 | Zhang | H04B 7/0695 |
| | | | | 370/329 |
| 2022/0190939 | A1* | 6/2022 | Zhang | H04B 7/0695 |
| 2023/0217504 | A1* | 7/2023 | Xiong | H04W 74/0891 |
| | | | | 370/329 |
| 2023/0421330 | A1* | 12/2023 | Faxér | H04L 5/0057 |

OTHER PUBLICATIONS

Office Action in the counterpart Chinese Application No. 201980095295.6, mailed Jun. 14, 2023 (19 pages).

(Continued)

*Primary Examiner* — Brian D Nguyen
(74) *Attorney, Agent, or Firm* — Osha Bergman Watanabe & Burton LLP

(57) ABSTRACT

A radio base station is disclosed including a first communication device that supports a cell; and a second communication device that is connected to the first communication device and controls the first communication device, wherein the second communication device transmits system information including a reference system frame number and a reference time associated with the reference system frame number to the first communication device, and the first communication device broadcasts the system information. In other aspects, a radio communication method and a radio communication system are also disclosed.

5 Claims, 10 Drawing Sheets

(56) References Cited

OTHER PUBLICATIONS

Huawei: "Reference timing delivery over F1", 3GPP TSG-RAN3 Meeting #103bis, R3-191917; Xi'an, China, Apr. 8-12, 2019 (2 pages).
International Search Report issued in PCT/JP2019/018072 on Jul. 2, 2019 (2 pages).
Written Opinion of the International Searching Authority issued in PCT/JP2019/018072 on Jul. 2, 2019 (4 pages).
ZTE; "Discussion on CU-DU Node Synchronization"; 3GPP TSG RAN WG3 Meeting #97bis, R3-173676; Prague, Czech Republic; Oct. 9-13, 2017 (3 pages).
3GPP TR 23.734 V16.0.0; "3rd Generation Partnership Project; Technical Specification Group Services and System Aspects; Study on enhancement of 5GS for Vertical and LAN Services (Release 16)"; Dec. 2018 (107 pages).
Office Action in the counterpart Chinese Application No. 201980095295.6, mailed Nov. 22, 2023 (14 pages).
Office Action in the counterpart Chinese Application No. 201980095295.6, mailed Apr. 24, 2024 (13 pages).

\* cited by examiner

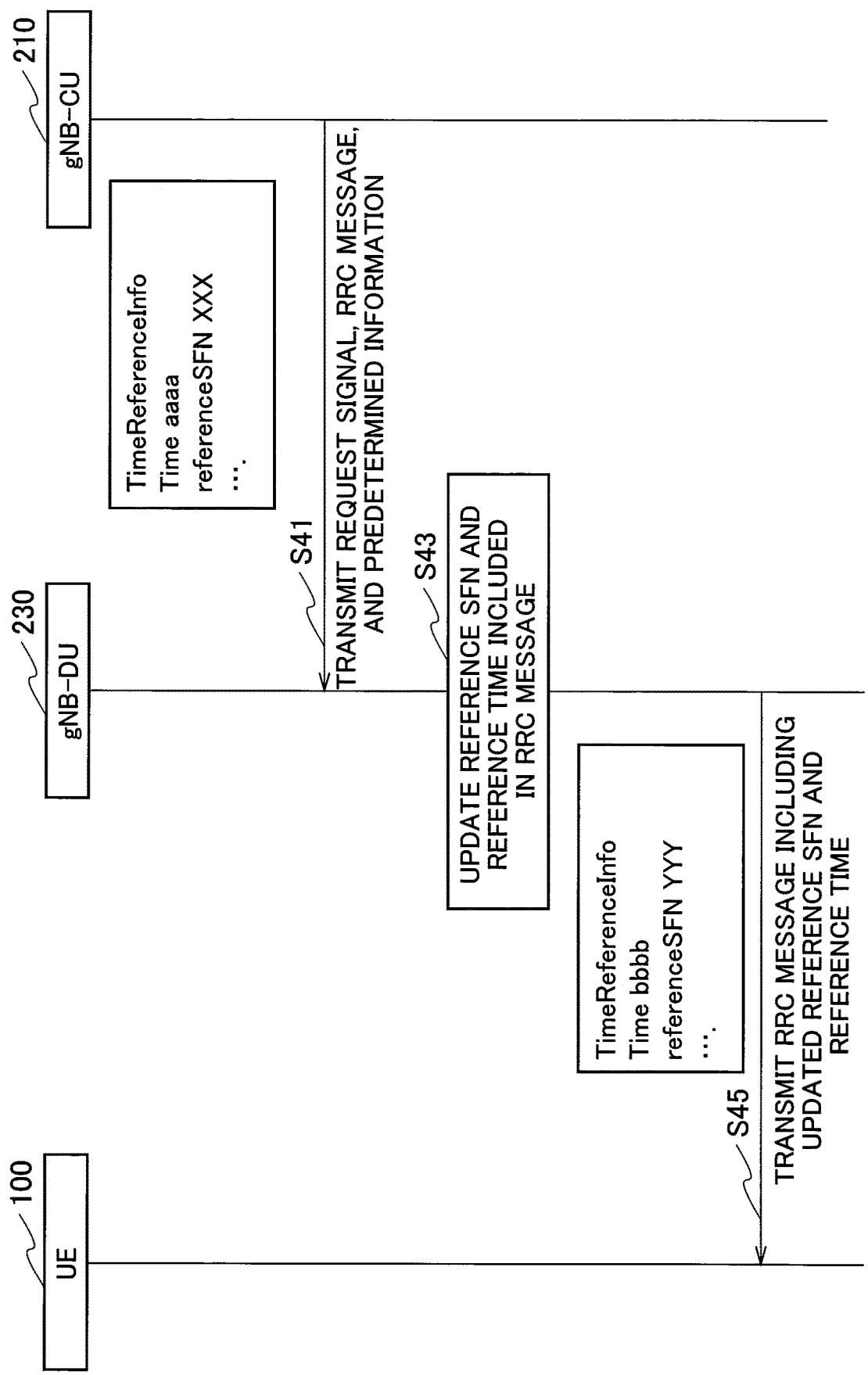

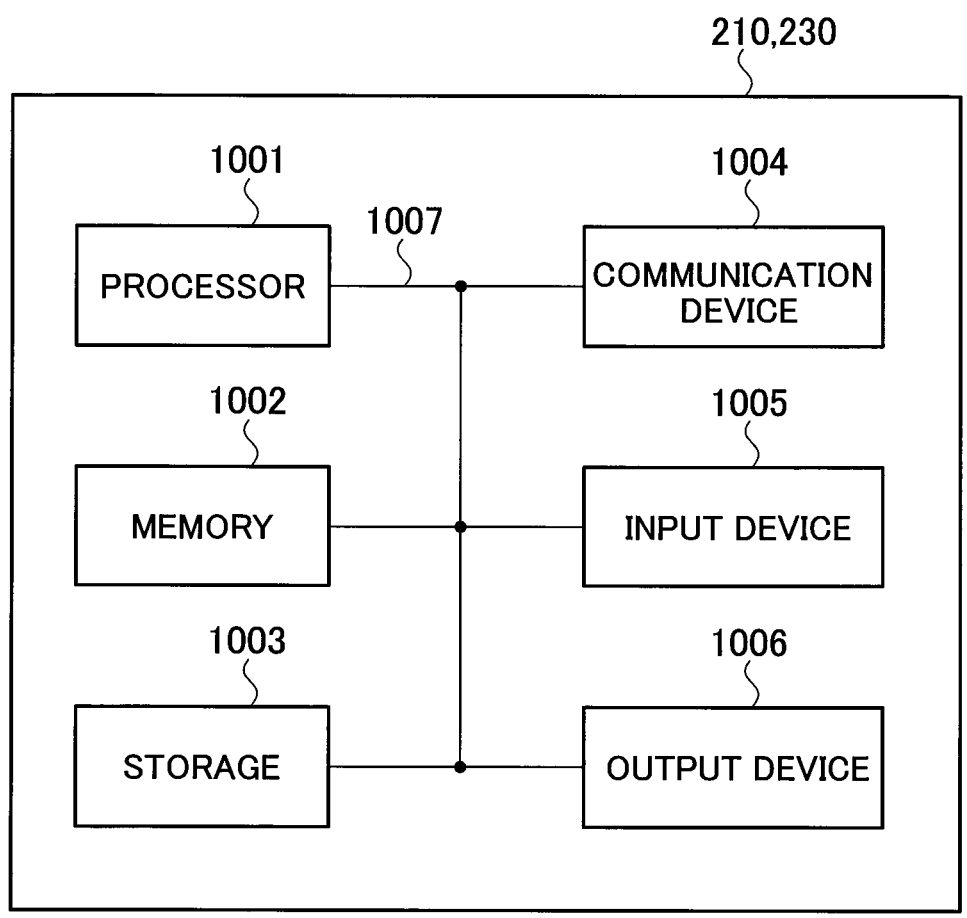

RADIO BASE STATION

TECHNICAL FIELD

The present invention relates to a radio base station that delivers a reference time.

BACKGROUND ART

The 3rd generation partnership project (3GPP) specifies Long Term Evolution (LTE), and specifies LTE-Advanced (hereinafter, collectively referred to as LTE) for the purpose of further speeding up LTE. In addition, in the 3GPP, specifications of a succession system of the LTE called 5G, New Radio (NR), or the like have been studied.

In the Industrial Internet of Things (IIoT), it has been studied that, in order to support Time-Sensitive Networking (TSN), in an NR system, a radio base station (gNB) delivers a reference time applied to at least one of the NR system and the TSN to a user equipment (UE) (see Non Patent Document 1). Thus, the UE can perform time synchronization based on the reference time.

Non Patent Document 1 discusses that the gNB delivers the reference time to the UE using at least one radio resource control (RRC) signaling of broadcast RRC signaling and unicast RRC signaling.

Meanwhile, in the NR system, the gNB is separated into a Central Unit (gNB-CU) and a Distributed Unit (gNB-DU) that is provided separately and arranged remotely from an installation place of the gNB-CU.

In the gNB having such a configuration, so-called Higher Layer Split (HLS) of CU-DU in which a lower layer such as a radio link control layer (RLC) is included in the gNB-DU, and a higher layer having a packet data convergence protocol layer (PDCP) and a layer higher than the PDCP is included in the gNB-CU, is defined in the NR.

In the HLS, transmission of the RRC signaling is performed by the gNB-CU.

PRIOR ART DOCUMENT

Non-Patent Document

Non Patent Document 1: 3GPP TR 23.734 V16.0.0 3rd Generation Partnership Project; Technical Specification Group Services and System Aspects; Study on enhancement of 5GS for Vertical and LAN Services (Release 16), 3GPP, December 2018

SUMMARY OF THE INVENTION

However, in the NR system, in a case where the gNB-CU delivers the reference time to the UE using the RRC signaling, the gNB-CU and the gNB-DU are physically separated from each other, and thus, there is a possibility that a delivery delay will occur between the gNB-CU and the gNB-DU.

In this case, the gNB cannot deliver an accurate reference time to the UE.

Therefore, the present invention has been made in view of such a situation, and an object of the present invention is to provide a radio base station capable of delivering an accurate reference time to a user equipment in HLS.

A radio base station (200) according to an aspect of the present invention includes: a first communication device (230) that performs communication with a user equipment (100); and a second communication device (210) that is connected to the first communication device (230) and performs communication with the user equipment (100) through the first communication device (230), wherein the second communication device (210) includes a transmitting unit (211) that transmits system information including a reference time in a predetermined network to the first communication device (230), and the first communication device (230) includes: a receiving unit (233) that receives the system information; a control unit (235) that updates the reference time included in the received system information; and a transmitting unit (231) that broadcasts the system information including the updated reference time.

A radio base station (200) according to an aspect of the present invention includes: a first communication device (230) that performs communication with a user equipment (100); and a second communication device (210) that is connected to the first communication device (230) and performs communication with the user equipment (100) through the first communication device (230), wherein the first communication device (230) includes a transmitting unit (231) that transmits a reference system frame number and a reference time in a predetermined network associated with the reference system frame number to the second communication device (210), the second communication device (210) includes: a receiving unit (213) that receives the reference system frame number and the reference time; and a transmitting unit (211) that transmits system information including the received reference system frame number and the received reference time to the first communication device, and the transmitting unit (231) of the first communication device (230) broadcasts the system information.

BRIEF DESCRIPTION OF DRAWINGS

FIG. 2 is an overall schematic configuration diagram of a remote control system 10a.

FIG. 10 is a diagram illustrating a sequence of delivery processing 3 of a reference time in unicast RRC signaling.

FIG. 11 is a diagram illustrating an example of a hardware configuration of the gNB-CU 210 and the gNB-DU 230.

MODES FOR CARRYING OUT THE INVENTION

Figure 1:
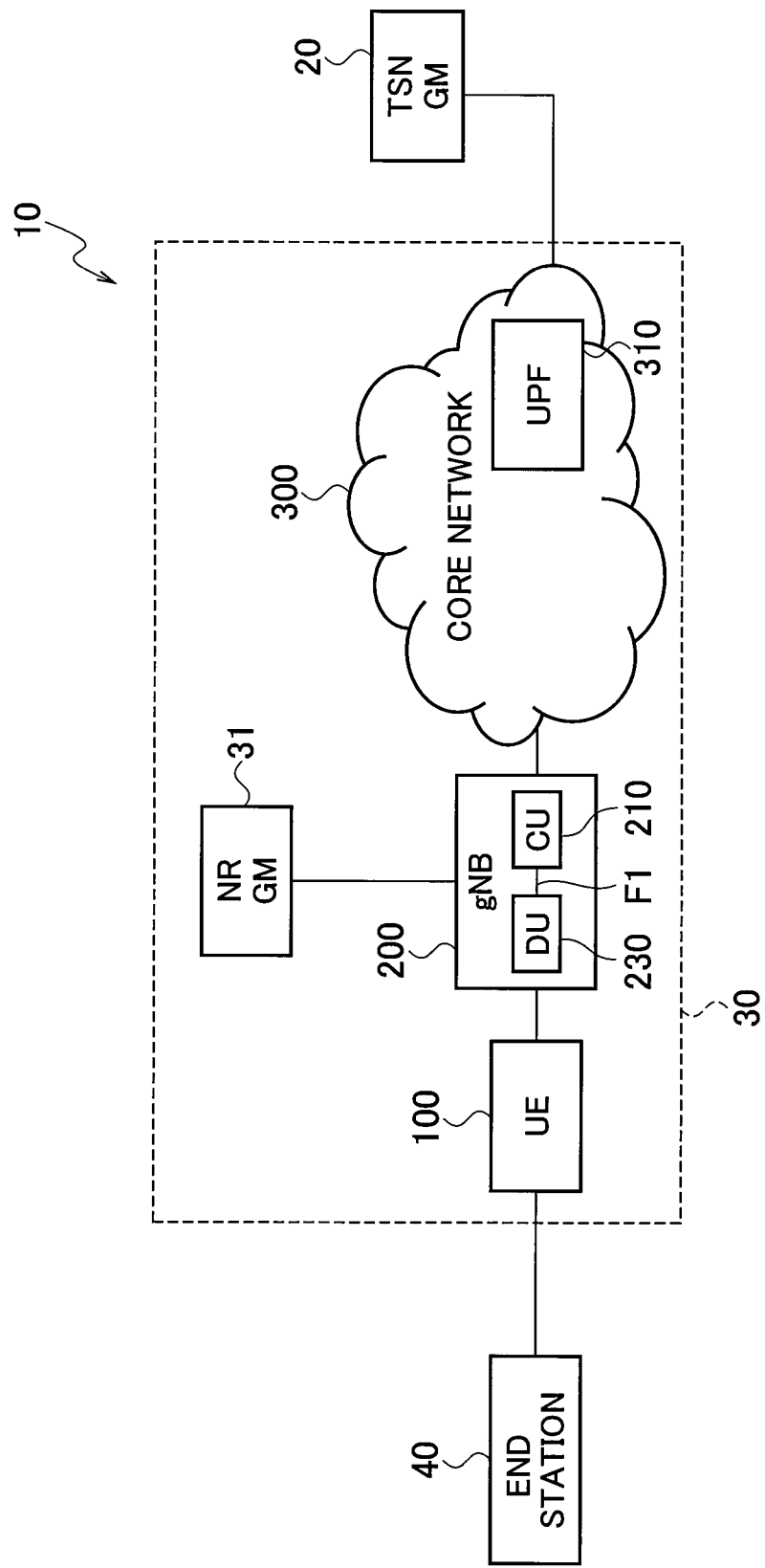
FIG. 1 is an overall schematic configuration diagram of a remote control system 10.

Hereinafter, embodiments will be described with reference to the drawings. Note that the same functions or configurations will be denoted by the same or similar reference numerals, and a description thereof will be appropriately omitted.

(1) Overall Schematic Configuration of Remote Control System

FIG. 1 is an overall schematic configuration diagram of a remote control system 10 according to the present embodiment.

The remote control system 10 includes a TSN grand master (TSN GM) 20, an NR system 30, and an end station 40. In the remote control system 10, a control source (not illustrated) of TSN remotely controls the end station 40 of the TSN in real time through the NR system 30. Note that a specific configuration of the remote control system 10 including the numbers of gNBs and UEs is not limited to an example illustrated in FIG. 1.

The TSN GM 20 oscillates a clock for generating a TSN time with high accuracy. Hereinafter, a time generated based on the clock oscillated by the TSN GM 20 is referred to as a TSN time. The TSN time is a reference time applied in the TSN.

In the remote control system 10, in order to realize remote control in real time, a time to be used at the control source of the TSN and a time to be used at the end station 40 need to be matched with the TSN time.

The NR system 30 includes an NR grand master (NR GM) 31, a UE 100, a gNB 200, and a core network 300.

The NR GM 31 oscillates a clock, which is an operation timing of the NR system 30. Hereinafter, a time generated based on the clock oscillated by the NR GM 31 is referred to as an NR time. The NR time is a reference time applied in the NR system 30.

The UE 100 executes radio communication according to the NR among the UE 100, the gNB 200, and the core network 300. The UE 100 receives at least one RRC signaling of broadcast RRC signaling and unicast RRC signaling including the NR time as the reference time, from the gNB 200. The UE 100 performs time synchronization based on the received NR time in order to support the TSN.

The gNB 200 performs radio communication according to the NR between the gNB 200 and the core network 300. The gNB 200 includes a Central Unit (gNB-CU) 210 and a Distributed Unit (gNB-DU) 230. The gNB-CU 210 is arranged to the core network 300 side, and controls the gNB-DU 230. The gNB-CU 210 may control a plurality of gNB-DUs 230. The gNB-DU 230 is arranged to the UE 100 side.

The gNB-CU 210 is connected to the gNB-DU 230 through an F1 interface (for example, an optical fiber). The gNB-CU 210 performs communication with the UE 100 through the gNB-DU 230. Note that a hub, a router and the like can be installed between the gNB-CU 210 and the gNB-DU 230.

In the gNB 200, at least the gNB-DU 230 performs time synchronization based on the NR time. Note that only the gNB-DU 230 may perform the time synchronization based on the NR time.

The gNB 200 transmits at least one RRC signaling of the broadcast RRC signaling and the unicast RRC signaling including the NR time as the reference time, to the UE 100, as described later.

The UE 100 and the gNB 200 can support Massive MIMO that generates beams with higher directivity, carrier aggregation (CA) that uses a plurality of component carriers (CCs), dual connectivity (DC) that simultaneously transmits component carriers between a plurality of gNBs and the UE, and the like, by controlling radio signals transmitted from a plurality of antenna elements.

The core network 300 communicates with the UE 100 through the gNB 200. The core network 300 has a User Plane Function (UPF) 310. The UPF 310 provides a function specialized for U-plane processing.

Figure 2:
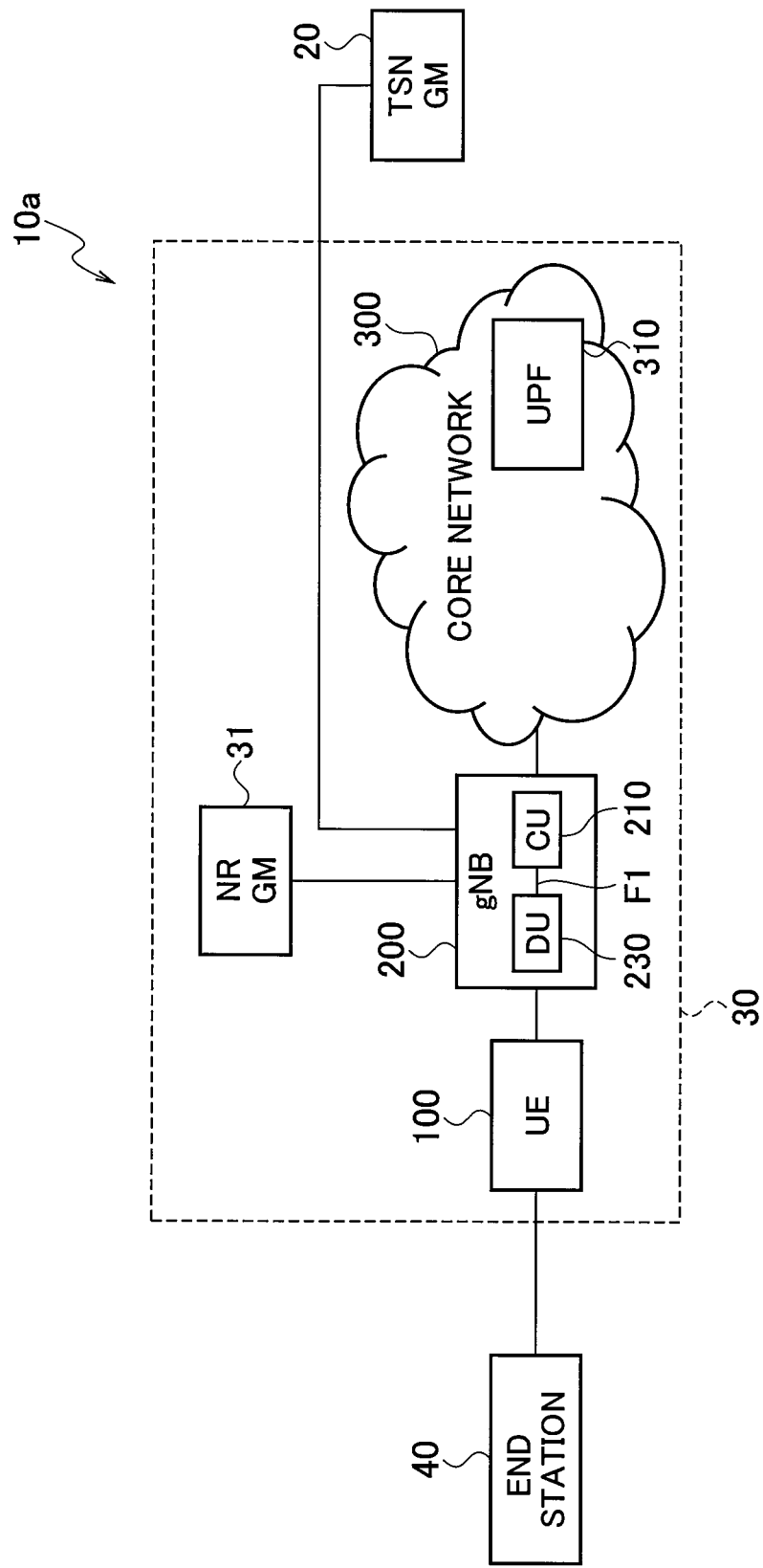

The UPF 310 is connected to the TSN GM 20. Note that, as illustrated in FIG. 2, in a remote control system 10a, the TSN GM 20 may be connected to the gNB 200 instead of the UPF 310. In this case, the gNB 200 can transmit at least one RRC signaling of broadcast RRC signaling and unicast RRC signaling including the TSN time as the reference time, to the UE 100. The UE 100 performs time synchronization based on the received TSN time in order to support TSN.

In this case, in the gNB 200, at least the gNB-DU 230 performs time synchronization based on at least one reference time of the NR time and the TSN time. Note that only the gNB-DU 230 may perform the time synchronization based on the reference time.

Note that, in this case, the gNB 200 may transmit at least one RRC signaling of broadcast RRC signaling and unicast RRC signaling including the NR time and the TSN time as the reference times, to the UE 100. The UE 100 may perform time synchronization based on at least one reference time of the received NR time and TSN time in order to support the TSN.

The end station 40 is a machine (for example, a robot arm) provided in a production plant. The end station 40 receives a command from the control source of the TSN through the NR system 30. The control source of the TSN executes real-time remote control in the remote control system 10 by performing time scheduling for operating the end station 40 based on the TSN time.

(2) Protocol Stack of gNB

Figure 3:
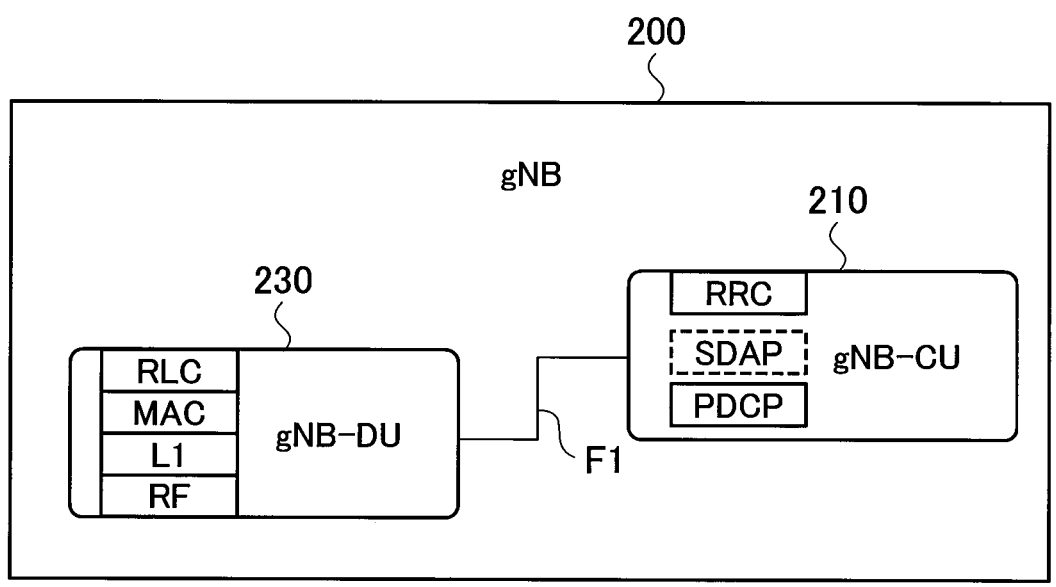
FIG. 3 is a diagram illustrating a protocol stack of a gNB 200.

Next, a protocol stack of the gNB 200 will be described. FIG. 3 illustrates the protocol stack of the gNB 200. As illustrated in FIG. 3, the gNB 200 includes the gNB-CU 210 and the gNB-DU 230.

The gNB-CU 210 provides higher layers, specifically, a packet data convergence protocol layer (PDCP) and a radio resource control layer (RRC). Note that the gNB-CU 210 may provide a service data adaptation protocol layer (SDAP).

The gNB-CU 210 controls an operation of the gNB-DU 230. The gNB-CU 210 terminates the F1 interface with the gNB-DU 230.

The gNB-DU 230 provides lower layers, specifically, a physical layer (L1), a radio frequency unit (RF), a medium access control layer (MAC), and a radio link control layer (RLC).

The gNB-DU 230 executes communication with the UE 100 through the lower layer. In the present embodiment, the gNB-DU 230 constitutes a first communication device executing radio communication with the UE 100.

The gNB-DU 230 supports one or a plurality of cells. One cell is supported by only one gNB-DU. The gNB-DU 230 terminates the F1 interface with the gNB-CU 210.

With such a configuration, the gNB-CU 210 is connected to the gNB-DU 230, and performs communication with the UE 100 through the RRC, which is higher than the lower layer such as the RLC. In the present embodiment, the gNB-CU 210 constitutes a second communication device connected to the gNB-DU 230 and performing communication with the UE 100 through the gNB-DU 230.

(3) Functional Block Configuration of gNB-CU

Next, a functional block configuration of the gNB-CU 210 will be described. Hereinafter, only portions related to features in the present embodiment will be described. Therefore, the gNB-CU 210 includes other functional blocks that are not directly related to the features in the present embodiment.

Figure 4:
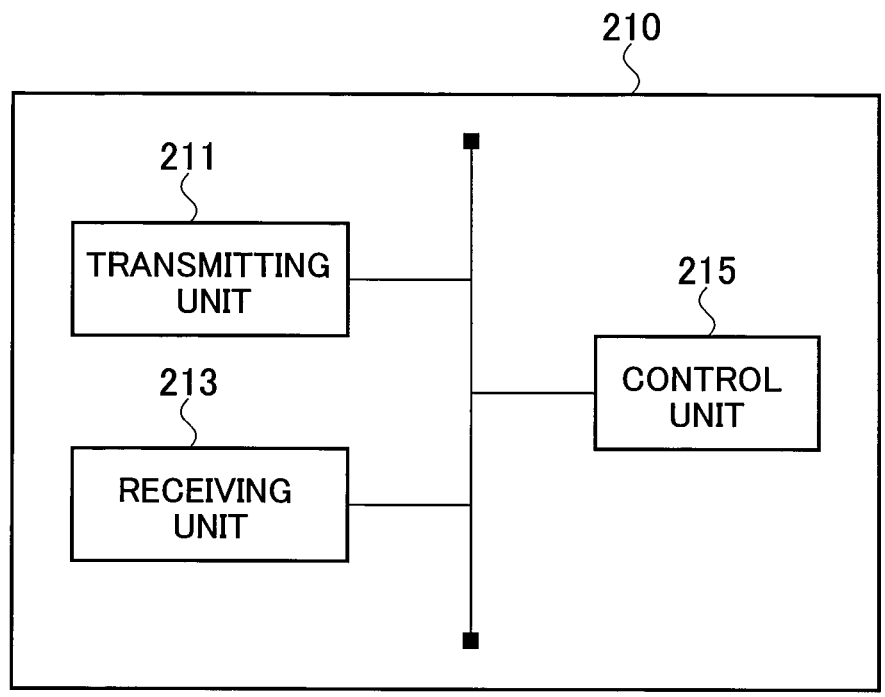
FIG. 4 is a functional block configuration diagram of a gNB-CU 210.

FIG. 4 is a functional block configuration diagram of the gNB-CU 210. Note that a hardware configuration of the gNB-CU 210 will be described later. As illustrated in FIG. 4, the gNB-CU 210 includes a transmitting unit 211, a receiving unit 213, and a control unit 215.

The transmitting unit 211 transmits encoded system information, an encoded RRC message, a request signal for requesting information related to a reference time from the gNB-DU 230, a request signal for requesting rewrite of TimeReferenceInforList, a message creation instruction for instructing the gNB-DU 230 to create an RRC message, predetermined information for the gNB-DU 230 to perform communication with the UE 100, and the like, to the gNB-DU 230.

The receiving unit 213 receives a reference SFN, a reference time in the gNB-DU 230 associated with the reference SFN, and the like, from the gNB-DU 230.

The control unit 215 performs configuration of system information, configuration of an RRC message, encoding of the system information, encoding of the RRC message, and the like.

(4) Functional Block Configuration of gNB-DU

Next, a functional block configuration of the gNB-DU 230 will be described. Hereinafter, only portions related to features in the present embodiment will be described. Therefore, the gNB-DU 230 includes other functional blocks that are not directly related to the features in the present embodiment.

Figure 5:
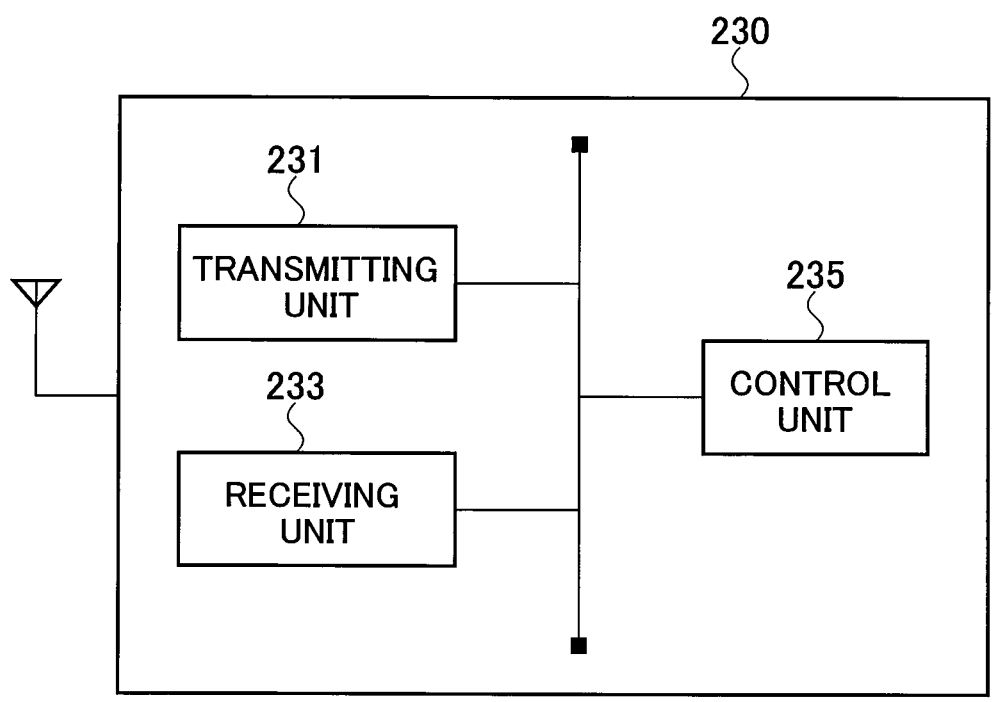
FIG. 5 is a functional block configuration diagram of a gNB-DU 230.

FIG. 5 is a functional block configuration diagram of the gNB-DU 230. Note that a hardware configuration of the gNB-DU 230 will be described later. As illustrated in FIG. 5, the gNB-DU 230 includes a transmitting unit 231, a receiving unit 233, and a control unit 235.

The transmitting unit 231 transmits the reference SFN, the reference time in the gNB-DU 230 associated with the reference SFN, and the like, to the gNB-CU 210. The transmitting unit 231 transmits encoded system information, an encoded RRC message, and the like, to the UE 100.

The receiving unit 233 receives the encoded system information, the encoded RRC message, the request signal for requesting the information related to the reference time from the gNB-DU 230, the request signal for requesting the rewrite of TimeReferenceInforList, the message creation instruction for instructing the gNB-DU 230 to create the RRC message, the predetermined information for the gNB-DU 230 to perform the communication with the UE 100, and the like, from the gNB-CU 210.

The control unit 235 performs update (rewrite) of the system information, configuration of the RRC message, update (rewrite) of the RRC message, decoding of the system information, encoding of the system information, encoding of the RRC message, and the like.

(5) Operation of NR System

Next, an operation of the NR system 30 will be described.
(5.1) Broadcast RRC Signaling First, processing in which the gNB 200 delivers the reference time to the UE 100 using the broadcast RRC signaling will be described. In the present embodiment, the gNB 200 broadcasts the system information as the broadcast RRC signaling.
(5.1.1) Delivery Processing 1 of Reference Time In delivery processing 1, a reference time is included in timeInfoUTC in system information (for example, System Information Block (SIB) 9) for broadcasting a time.

Figure 6:
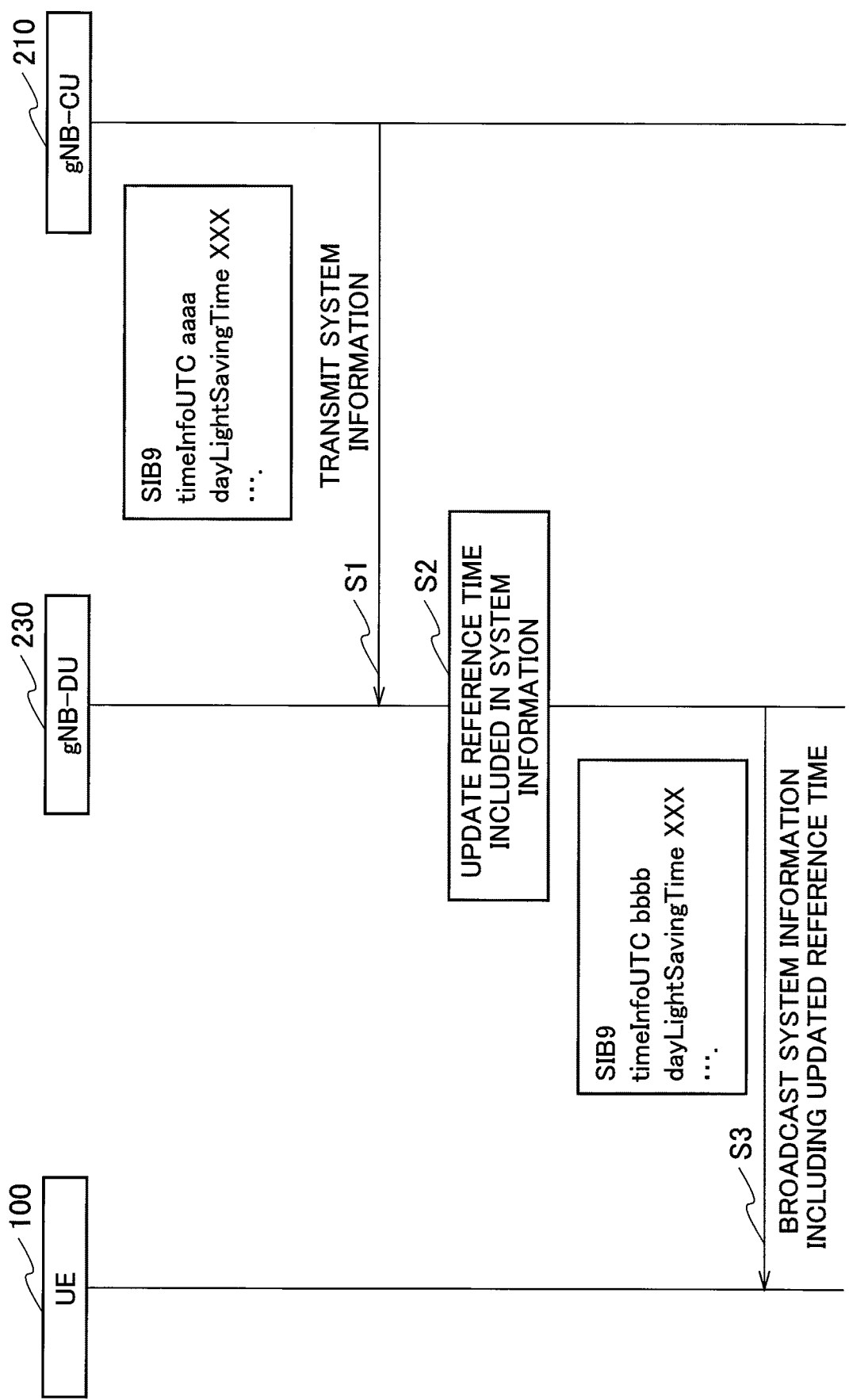
FIG. 6 is a diagram illustrating a sequence of delivery processing 1 of a reference time in broadcast RRC signaling.

FIG. 6 is a diagram illustrating a sequence of delivery processing 1 of a reference time.

The gNB-CU 210 includes an NR time at a timing of delivering system information as the reference time, in timeInfoUTC in the system information. In the present embodiment, a reference time aaaa is included in timeInfoUTC in SIB9. The gNB-CU 210 encodes the system information and transmits the encoded system information to the gNB-DU 230 (S1).

When the gNB-DU 230 receives the system information, the gNB-DU 230 decodes the system information. The gNB-DU 230 updates the NR time included in timeInfoUTC in the system information to an NR time at the timing of delivering system information (S2). In the present embodiment, the reference time aaaa included in timeInfoUTC in SIB9 is updated to a reference time bbbb.

The gNB-DU 230 encodes the system information, and broadcasts the system information including the updated reference time (S3).

Note that, as illustrated in FIG. 2, in a case where the TSN GM 20 is connected to the gNB 200, at least one reference time of the NR time and the TSN time can be included in timeInfoUTC.
(5.1.2) Delivery Processing 2 of Reference Time In delivery processing 2, an information element TimeReferenceInfoList is configured in system information (for example, System Information Block (SIB) 9) for broadcasting a time.

A system frame number (reference SFN) assigned to a radio frame that serves as a reference is included in referenceSFN in the information element TimeReferenceInfoList. In addition, an NR time in the gNB-DU 230 associated with the reference SFN included in referenceSFN, is included in Time in the information element TimeReferenceInfoList as the reference time.

Here, the reference time included in Time corresponds, for example, to the NR time in the gNB-DU 230 at a termination boundary of a System Information window (SI window), which is a period for transmitting system information, or at an SFN boundary immediately after the termination boundary.

Note that, as illustrated in FIG. 2, in a case where the TSN GM 20 is connected to the gNB 200, at least one reference time of the NR time and the TSN time in the gNB-DU 230 can be included in Time in the information element TimeReferenceInfoList.

Figure 7:
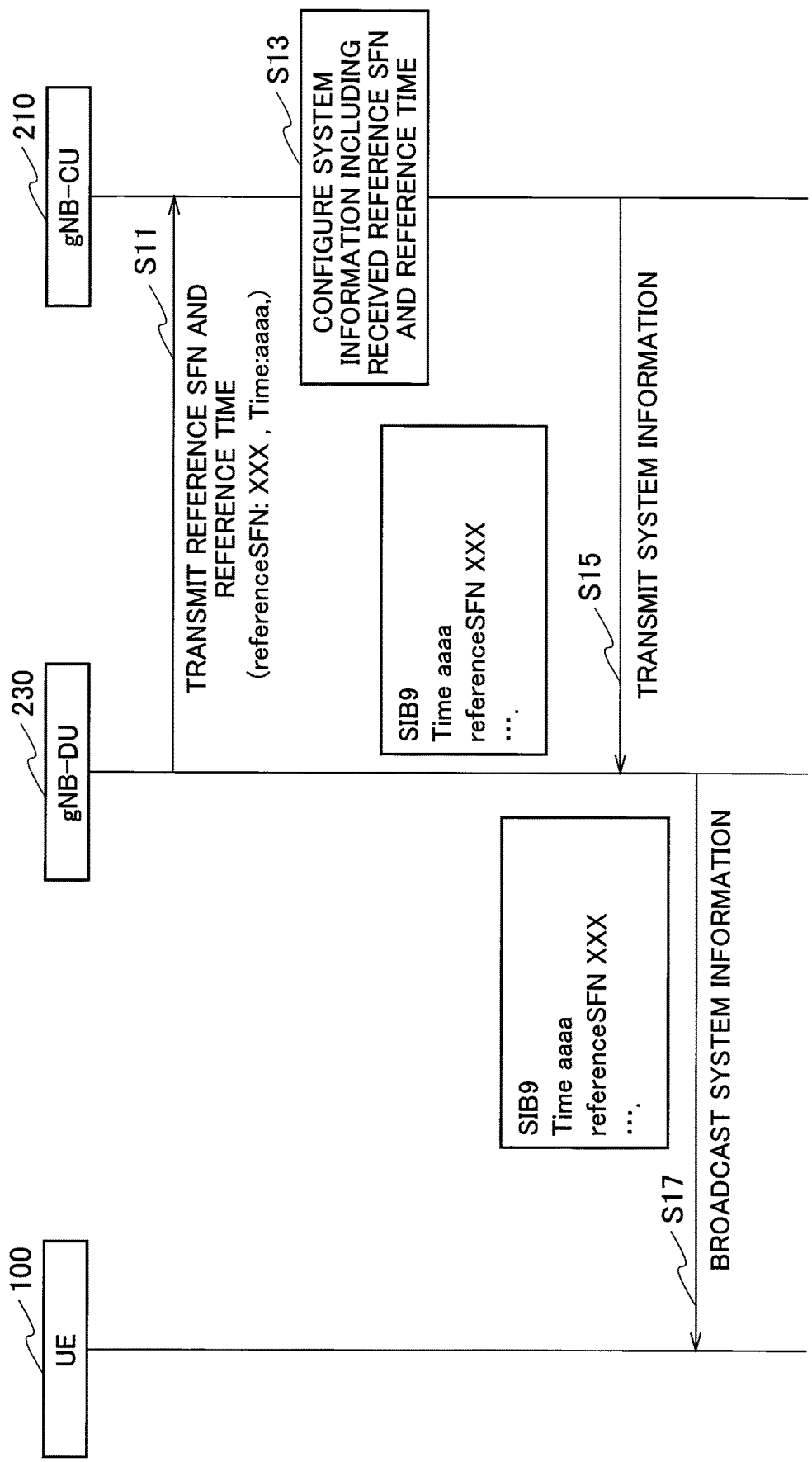
FIG. 7 is a diagram illustrating a sequence of delivery processing 2 of a reference time in broadcast RRC signaling.

FIG. 7 is a diagram illustrating a sequence of delivery processing 2 of a reference time.

The gNB-DU 230 transmits a reference SFN and a reference time in the gNB-DU 230 associated with the reference SFN to the gNB-CU 210 based on a request from the gNB-CU 210, a predetermined timing, or the like (S11). In the present embodiment, a reference SFN XXX is transmitted as referenceSFN, and a reference time aaaa is transmitted as Time.

The gNB-CU 210 includes the reference SFN transmitted from the gNB-DU 230 in referenceSFN of an information element TimeReferenceInfoList in system information, and includes the reference time transmitted from the gNB-DU 230 in Time of the information element TimeReferenceInfoList (S13).

In the present embodiment, a reference SFN XXX is included in referenceSFN of an information element TimeReferenceInfoList in SIBS, and a reference time aaaa is included in Time of the information element TimeReferenceInfoList.

The gNB-CU 210 encodes the system information, and transmits the system information including the reference SFN and the reference time transmitted from the gNB-DU 230 to the gNB-DU 230 (S15). The gNB-DU 230 broadcasts the transmitted system information (S17).

Note that the gNB 200 may select any one of the delivery processing 1 and the delivery processing 2 described above according to the information element in which the reference time is included. For example, in a case where the reference time is delivered to the UE 100 using timeInfoUTC in the system information, the gNB 200 selects the delivery processing 1. On the other hand, in a case where the reference time is delivered to the UE 100 using the information element TimeReferenceInfoList in the system information, the gNB 200 selects the delivery processing 2.

(5.2) Unicast RRC Signaling

Next, processing in which the gNB 200 delivers the reference time to the UE 100 using the unicast RRC signaling will be described. In the present embodiment, the gNB 200 transmits an RRC message as the unicast RRC signaling.

In delivery processing 1 to delivery processing 3 described later, an information element TimeReferenceInfoList is configured in the RRC message (for example, a DLInformationTransfer message).

A system frame number (reference SFN) assigned to a radio frame that serves as a reference is included in referenceSFN in the information element TimeReferenceInfoList. In addition, an NR time in the gNB-DU 230 associated with the reference SFN included in referenceSFN, is included in Time in the information element TimeReferenceInfoList, as the reference time.

Here, the reference time included in Time corresponds to the NR time in the gNB-DU 230 at a termination boundary of the SFN configured in the reference SFN.

Note that, as illustrated in FIG. 2, in a case where the TSN GM 20 is connected to the gNB 200, at least one reference time of the NR time and the TSN time in the gNB-DU 230 can be included in Time in the information element TimeReferenceInfoList.

(5.2.1) Delivery Processing 1 of Reference Time

Figure 8:
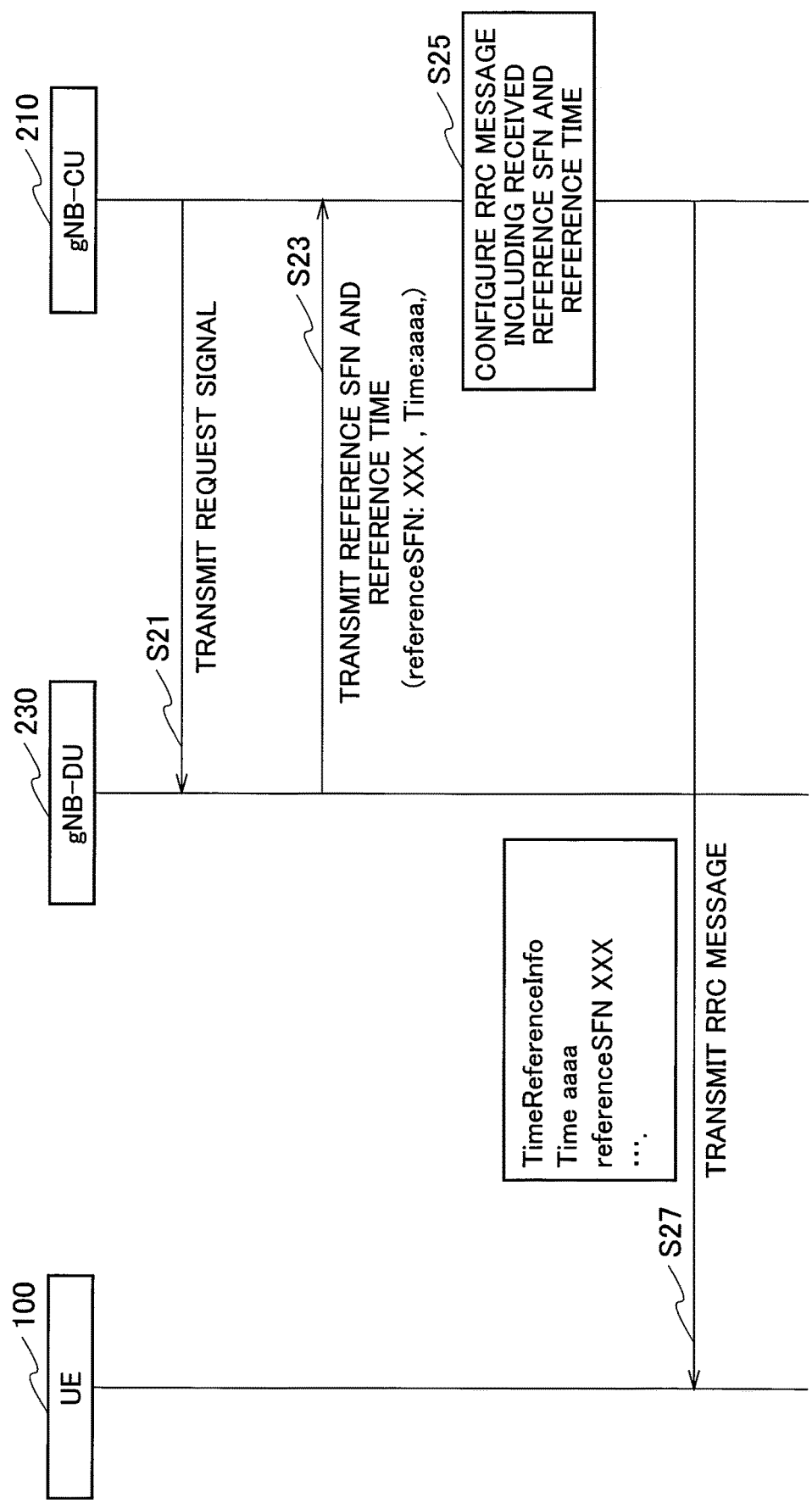
FIG. 8 is a diagram illustrating a sequence of delivery processing 1 of a reference time in unicast RRC signaling.

FIG. 8 is a diagram illustrating a sequence of delivery processing 1 of a reference time.

The gNB-CU 210 transmits a request signal to the gNB-DU 230 in order to request information related to a reference time from the gNB-DU 230 (S21). The gNB-DU 230 transmits a reference SFN and a reference time in the gNB-DU 230 associated with the reference SFN to the gNB-CU 210 according to reception of the request signal (S23). In the present embodiment, a reference SFN XXX is transmitted as referenceSFN, and a reference time aaaa is transmitted as Time.

The gNB-CU 210 includes the reference SFN transmitted from the gNB-DU 230 in referenceSFN of an information element TimeReferenceInfoList in an RRC message addressed to the UE 100, and includes the reference time transmitted from the gNB-DU 230 in Time of the information element TimeReferenceInfoList (S25).

In the present embodiment, a reference SFN XXX is included in referenceSFN of an information element TimeReferenceInfoList in a DLInformationTransfer message, and a reference time aaaa is included in Time of the information element TimeReferenceInfoList.

The gNB-CU 210 encodes the RRC message, and transmits the RRC message including the reference SFN and the reference time transmitted from the gNB-DU 230, to the UE 100 through the gNB-DU 230 (S27).

Note that the UE 100 may notify the gNB-CU 210 of an acknowledgment signal (ACK) through the gNB-DU 230 in a case where the UE 100 receives the RRC message.

(5.2.2) Delivery Processing 2 of Reference Time

Figure 9:
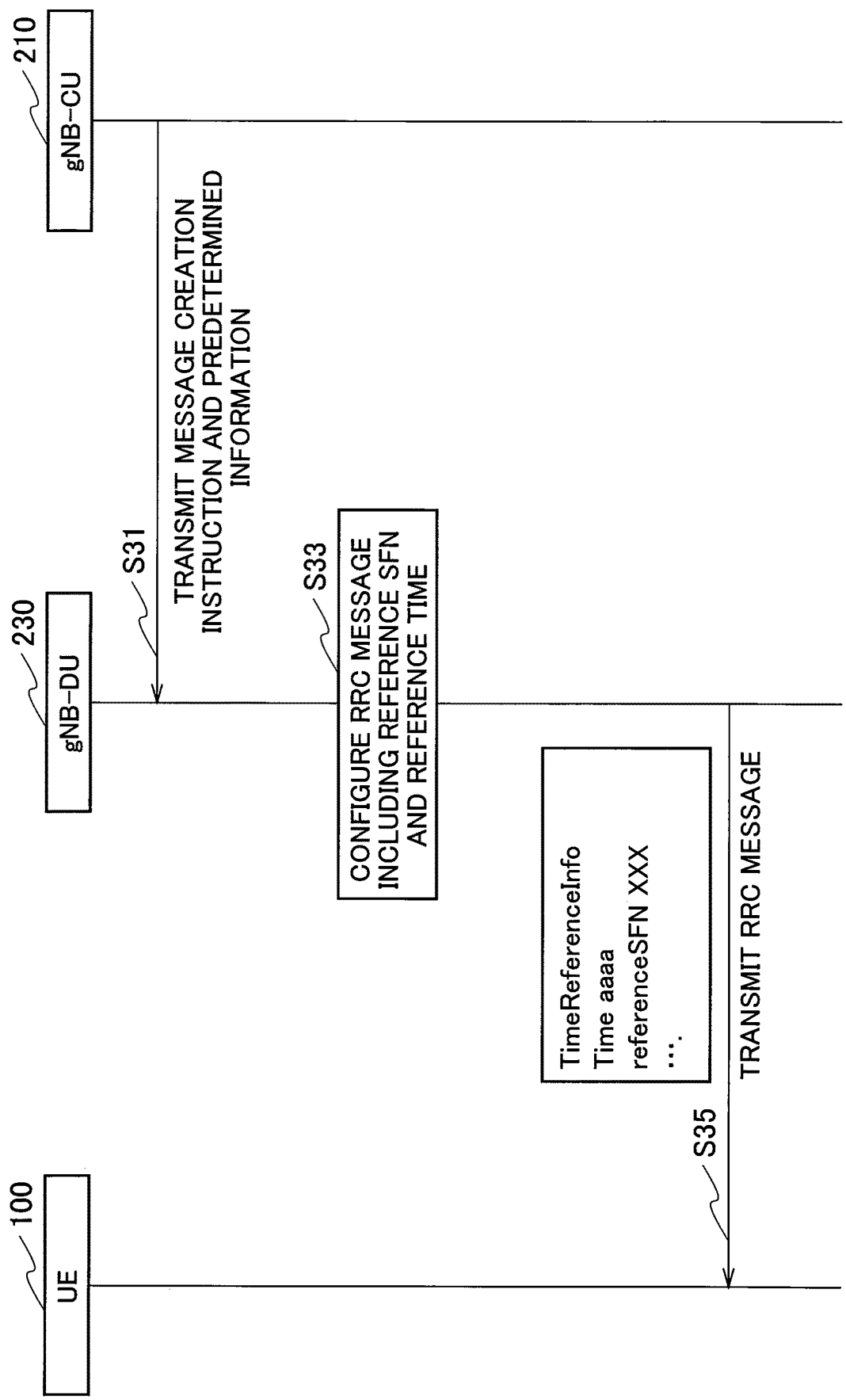
FIG. 9 is a diagram illustrating a sequence of delivery processing 2 of a reference time in unicast RRC signaling.

FIG. 9 is a diagram illustrating a sequence of delivery processing 2 of a reference time.

The gNB-CU 210 transmits a message creation instruction to the gNB-DU 230 in order to instruct the gNB-DU 230 to create an RRC message addressed to the UE 100 (S31). In this case, the gNB-CU 210 notifies the gNB-DU 230 of predetermined information for the gNB-DU 230 to perform communication with the UE 100, together with the message creation instruction.

Examples of the predetermined information can include the following information elements: Transaction ID, Cyphering Algorithm, KEY (Security Key), BEARER (Bearer Identity-1), COUNT (HFN+PDCP SN), DIRECTION (0 for uplink and 1 for downlink), and LENGTH.

The gNB-CU 210 notifies the gNB-DU 230 of all or some of the information elements described above as the predetermined information. Note that since the RRC message is transmitted in a downlink, it is obvious that 1 is included in DIRECTION. Therefore, a notification of DIRECTION may be omitted.

In addition, a length of encoded data is included in LENGTH. Also in the gNB-DU 230, it is possible to identify the length of the encoded data, and a notification of LENGTH may thus be omitted.

Here, Cyphering Algorithm and KEY (Security Key) are information used to encode the RRC message and uniquely decided between the UE 100 and the gNB-CU 210. Therefore, in order for the UE 100 to succeed in decoding the RRC message, the gNB-DU 230 needs to encode the RRC message using Cyphering Algorithm and KEY (Security Key) uniquely decided between the UE 100 and the gNB-CU 210. Therefore, the gNB-CU 210 needs to notify the gNB-DU 230 of at least Cyphering Algorithm and KEY (Security Key).

The gNB-DU 230 configures the RRC message addressed to the UE 100 according to reception of the message creation instruction. In this case, the gNB-DU 230 includes a reference SFN in referenceSFN of the information element TimeReferenceInfoList in the RRC message, and includes a reference time in the gNB-DU 230 in Time of the information element TimeReferenceInfoList (S33). In the present embodiment, a reference SFN XXX is included as referenceSFN, and a reference time aaaa is included as Time.

The gNB-DU 230 encodes the RRC message based on the predetermined information, and transmits the RRC message including the reference SFN and the reference time to the UE 100 (S35).

Note that the UE 100 may notify the gNB-CU 210 of an acknowledgment signal (ACK) through the gNB-DU 230 in a case where the UE 100 receives the RRC message.

(5.2.3) Delivery Processing 3 of Reference Time

FIG. 10 is a diagram illustrating a sequence of delivery processing 3 of a reference time.

The gNB-CU 210 notifies the gNB-DU 230 of a request signal for requesting rewrite of TimeReferenceInfoList, an encoded RRC message addressed to the UE 100, and predetermined information for the gNB-DU 230 to perform communication with the UE 100 (S41). A reference SFN is included in referenceSFN of the information element TimeReferenceInfoList in the RRC message, and a reference time in the gNB-CU 210 associated with the reference SFN is included in Time of the information element TimeReferenceInfoList.

In the present embodiment, a reference SFN XXX is included as referenceSFN, and a reference time aaaa is included as Time.

When the gNB-DU 230 receives the RRC message, the gNB-DU 230 decodes the RRC message. The gNB-DU 230 updates the reference SFN included in referenceSFN of the information element TimeReferenceInfoList in the RRC message, and updates the reference time included in Time of the information element TimeReferenceInfoList (S43). In the present embodiment, the reference SFN XXX included in referenceSFN is updated to YYY, and the reference time aaaa included in Time is updated to bbbb.

The gNB-DU 230 encodes the RRC message based on the predetermined information, and transmits the RRC message including the updated reference SFN and reference time to the UE 100 (S45).

Note that the UE 100 may notify the gNB-CU 210 of an acknowledgment signal (ACK) through the gNB-DU 230 in a case where the UE 100 receives the RRC message.

At least one delivery processing of the delivery processing 1 and 2 of the reference time in the broadcast RRC signaling described above and at least one delivery processing of the delivery processing 1 to 3 of the reference time in the unicast RRC signaling described above may be combined with each other to deliver the reference time to the UE 100.

(5) Action and Effect

According to the embodiment described above, the gNB 200 includes the gNB-DU 230 that performs the communication with the UE 100 and the gNB-CU 210 that is connected to the gNB-DU 230 and performs the communication with the UE 100 through the gNB-DU 230.

The gNB-CU 210 includes the transmitting unit 211 that transmits the system information including at least one reference time of the NR time and the TSN time to the gNB-DU 230.

The gNB-DU 230 includes the receiving unit 233 that receives the system information, the control unit 235 that updates the reference time included in the received system information, and the transmitting unit 231 that broadcasts the system information including the updated reference time.

With such a configuration, in the gNB-DU 230 arranged the UE 100 side, the reference time included in the system information is updated, and an influence of a delay between the gNB-CU 210 and the gNB-DU 230 can thus be suppressed as much as possible.

Therefore, the gNB 200 can deliver an accurate reference time to the UE 100.

In addition, with such a configuration, the gNB 200 can be operated only by changing a configuration of the gNB-DU 230 without changing a configuration of the conventional gNB-CU 210. Further, the gNB-DU 230 does not need to configure information other than the reference time in the system information.

Therefore, it is possible to deliver the accurate reference time to the UE 100 while suppressing the change in the configuration of the conventional gNB 200 as much as possible.

According to the embodiment described above, the gNB 200 includes the gNB-DU 230 that performs the communication with the UE 100 and the gNB-CU 210 that is connected to the gNB-DU 230 and performs the communication with the UE 100 through the gNB-DU 230.

The gNB-DU 230 includes the transmitting unit 231 that transmits the reference SFN and at least one reference time of the NR time and the TSN time associated with the reference SFN to the gNB-CU 210.

The gNB-CU 210 includes the receiving unit 213 that receives the reference SFN and the reference time and the transmitting unit 211 that transmits the system information including the received reference SFN and reference time to the gNB-DU 230. The transmitting unit 231 of the gNB-DU 230 broadcasts the system information.

With such a configuration, it is not necessary to broadcast the reference time at a timing of delivering the system information, and synchronization between the gNB-CU 210 and the gNB-DU 230 thus becomes unnecessary.

Therefore, the gNB 200 can deliver an accurate reference time to the UE 100.

In addition, with such a configuration, the gNB-CU 210 transmits the system information as in the related art, and a change in a configuration of the conventional gNB-CU 210 can thus be suppressed as much as possible. Further, information other than the reference SFN and the reference time associated with the reference SFN does not need to be configured in the gNB-DU 230.

According to the embodiment described above, only the gNB-DU 230 performs the time synchronization based on at least one reference time of the NR time and the TSN time.

With such a configuration, the gNB 200 can deliver a more accurate reference time to the UE 100.

(6) Other Embodiments

Although the contents of the present invention have been described hereinabove with reference to the embodiments, it is obvious to those skilled in the art that the present invention is not limited to these descriptions, and can be variously modified and improved.

The block diagrams (FIGS. 4 and 5) used for describing the embodiments illustrate blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as explained above, the realization method is not particularly limited to any one method.

Furthermore, the gNB-CU 210 and the gNB-DU 230 explained above may function as a computer that performs the processing of the radio communication method of the present disclosure. FIG. 11 is a diagram illustrating an example of a hardware configuration of the device. As illustrated in FIG. 11, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. A hardware configuration of the device may be constituted by including one or plurality of the devices illustrated in the figure, or may be constituted by without including a part of the devices.

The functional blocks of the device are realized by any of hardware elements of the computer device or a desired combination of the hardware elements.

Moreover, the processor 1001 performs operation by loading a predetermined software (program) on hardware such as the processor 1001 and the memory 1002, and realizes various functions of the device by controlling communication via the communication device 1004 and controlling at least one of reading and writing of data on the memory 1002 and the storage 1003.

The processor 1001, for example, operates an operating system to control the entire computer. The processor 1001 may be configured with a central processing unit (CPU) including an interface with a peripheral device, a control device, an operation device, a register, and the like.

Moreover, the processor 1001 reads a program (program code), a software module, data, and the like from at least one of the storage 1003 and the communication device 1004 into the memory 1002, and executes various processing according to them. As the program, a program that is capable of executing on the computer at least a part of the operation explained in the above embodiments, is used. Alternatively, various processing explained above may be executed by one processor 1001 or may be executed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 may be called register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 may include at least one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 may be called an auxiliary storage device. The recording medium may be, for example, a database including at least one of the memory 1002 and the storage 1003, a server, or other appropriate medium.

The communication device 1004 is hardware (transmission/reception device) capable of performing communication between computers via at least one of a wired network and a wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information therebetween. The bus 1007 may be constituted by a single bus or may be constituted by separate buses between the devices.

Further, the device may be configured to include hardware such as a microprocessor, Digital Signal Processor (DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or may be RRC Connection Setup message, RRC Connection Reconfiguration message, or the like.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input/output information may be stored in a specific location (for example, a memory) or may be managed in a management table. The information to be input/output can be overwritten, updated, or added. The information may be deleted after outputting. The inputted information may be transmitted to another device.

The determination may be made by a value (0 or 1) represented by one bit or by a Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of at least one of a base station and a base station subsystem that perform communication service in this coverage.

In the present disclosure, the terms "mobile station (Mobile Station: MS)", "user terminal", "user equipment (User Equipment: UE)", "terminal" and the like can be used interchangeably.

The mobile station may be called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same applies). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, and printed electrical connections, and as some non-limiting and non-exhaustive examples, by using electromagnetic energy having wavelengths in the radio frequency region, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles may include plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

Industrial Applicability

According to the radio base station described above, an accurate reference time can be delivered to the user equipment in HLS, which is useful.

EXPLANATION OF REFERENCE NUMERALS 10, 10a remote control system
20 TSN GM
30 NR system
31 NR GM
40 end station
100 UE
200 gNB
210 gNB-CU
211 transmitting unit
213 receiving unit
215 control unit
230 gNB-DU
231 transmitting unit
233 receiving unit
235 control unit
300 core network
310 UPF
1001 processor
1002 memory
1003 storage
1004 communication device
1005 input device
1006 output device
1007 bus

The invention claimed is:

1. A radio base station comprising:
a first communication device that supports a cell; and
a second communication device that is connected to the first communication device and controls the first communication device,
wherein
the first communication device transmits a reference system frame number and a reference time to the second communication device, based on a request from the second communication device,
the second communication device transmits system information including the reference system frame number and the reference time associated with the reference system frame number to the first communication device, and
the first communication device broadcasts the system information.

2. The radio base station according to claim 1, wherein the reference time is a reference time applied in a 5G system.

3. The radio base station according to claim 1, wherein only the first communication device performs time synchronization based on a clock by a 5G grand master.

4. A radio communication method comprising:
transmitting, by a first communication device, a reference system frame number and a reference time to a second communication device that controls the first communication device, based on a request from the second communication device;
transmitting, by the second communication device, system information including the reference system frame number and the reference time associated with the reference system frame number to the first communication device; and broadcasting, by the first communication device, the system information.

5. A radio communication system comprising:

a terminal;

a first communication device that supports a cell; and a second communication device that is connected to the first communication device and controls the first communication device, wherein the first communication device transmits a reference system frame number and a reference time to the second communication device, based on a request from the second communication device, the second communication device transmits system information including the reference system frame number and the reference time associated with the reference system frame number to the first communication device, the first communication device broadcasts the system information, and the terminal receives the system information.

* * * * *